(12) United States Patent
Lauermann et al.

(10) Patent No.: US 6,535,171 B1
(45) Date of Patent: Mar. 18, 2003

(54) VEHICLE VENT THROUGH AN OPENING IN A RADIO ANTENNA BASE

(75) Inventors: Andreas Lauermann, Eich (DE); Sandra Schaaf, Hochheim (DE)

(73) Assignee: General Motors Corporation, Detroit, MI (US)

( * ) Notice: Subject to any disclaimer, the term of this patent is extended or adjusted under 35 U.S.C. 154(b) by 30 days.

(21) Appl. No.: 09/891,857

(22) Filed: Jun. 25, 2001

(51) Int. Cl.[7] ................................................ H01Q 1/32
(52) U.S. Cl. ................... 343/715; 343/711; 296/216.05
(58) Field of Search ................................. 343/711, 712, 343/713, 715, 704; 296/37.1, 37.7, 216.01, 210, 216.05, 217

(56) References Cited

U.S. PATENT DOCUMENTS

| | | | | |
|---|---|---|---|---|
| 5,838,281 A | * | 11/1998 | Blaese | 343/711 |
| 6,275,194 B1 | * | 8/2001 | Ansorge | 343/713 |
| 6,331,838 B1 | * | 12/2001 | Scott et al. | 343/715 |
| 6,366,249 B1 | * | 4/2002 | Jones et al. | 343/703 |

* cited by examiner

*Primary Examiner*—Tan Ho
(74) *Attorney, Agent, or Firm*—Cary W. Brooks

(57) ABSTRACT

Venting a closed compartment of a vehicle through an opening provided in a radio antenna base, which opening is aligned with a vent hole in the roof of the compartment.

8 Claims, 1 Drawing Sheet

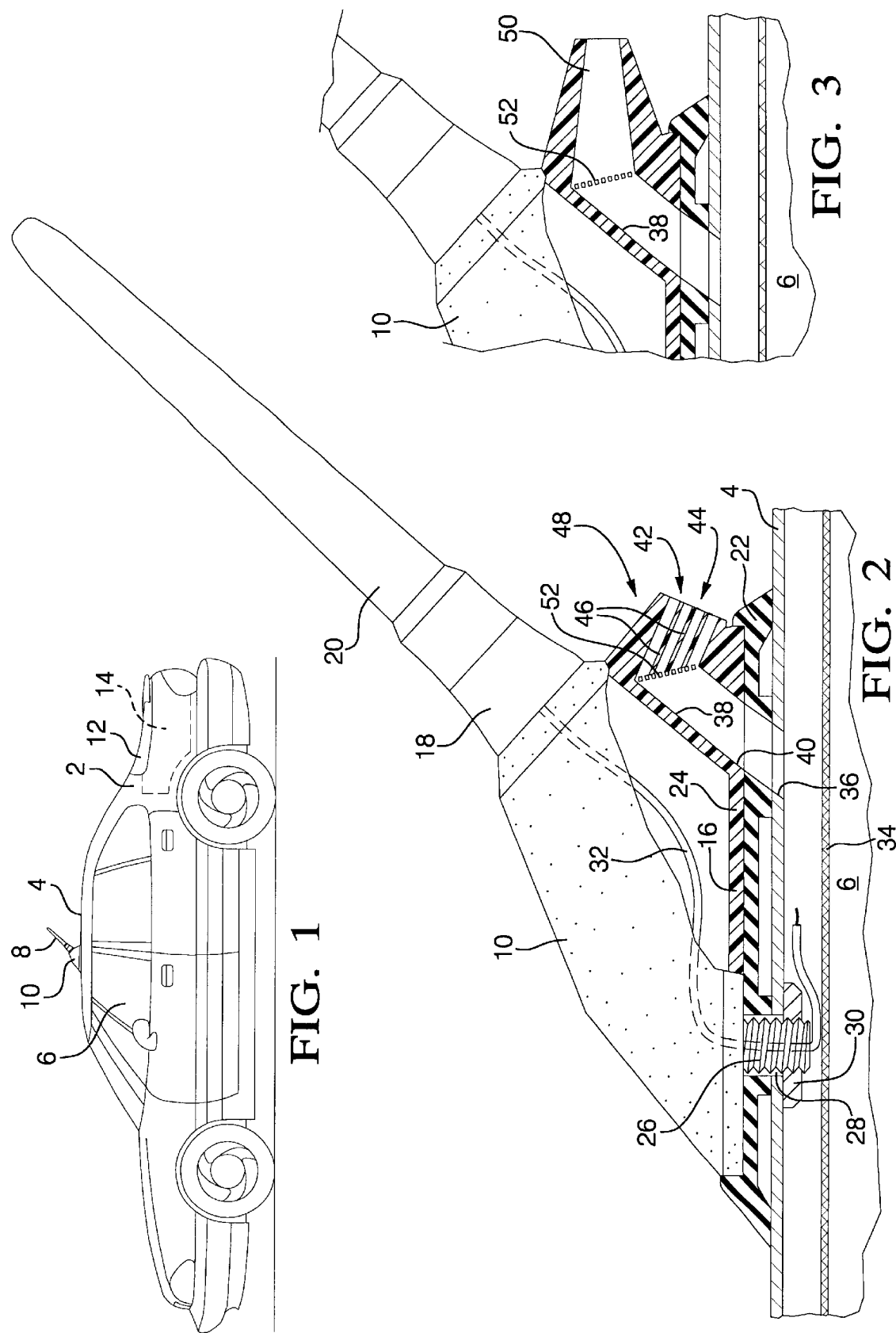

US 6,535,171 B1

VEHICLE VENT THROUGH AN OPENING IN A RADIO ANTENNA BASE

TECHNICAL FIELD

This invention relates to vents for venting closed compartments (e.g. passenger compartment) of vehicles.

BACKGROUND OF THE INVENTION

Vehicles such as automobiles and trucks have one or more closed compartments for such purposes as storage (i.e. a trunk or boot) or occupancy (i.e. passenger compartment). Undesirable fumes (e.g. cigarette smoke, offgases from vehicle construction materials, vapors from transported materials, etc.) can collect in the compartments. Over the years, different schemes have been proposed for ventilating these compartments. The present invention provides a low-cost vent for closed compartments of a vehicle.

SUMMARY OF THE INVENTION

The present invention contemplates a vehicle having a compartment (e.g. passenger compartment) that is vented through an opening in the base of a radio antenna secured to the roof of the compartment. More specifically, the invention relates to a vehicle having a roof defining a closed compartment, and a radio antenna base secured to the roof at its highpoint. A hole is provided through the roof and an opening through the antenna base. The opening in the antenna base is aligned with the hole in the roof so as to communicate and vent the compartment to the atmosphere. Preferably, the opening has a fist inlet end adjacent the roof hole, and a second, exhaust end that opens to the atmosphere and includes a barrier for restricting intrusion of rain, sleet or snow into opening. Suitable barriers include one or more downwardly angling louvers or a nozzle inter alia. The opening in the antenna base will preferably include a heater (e.g. electrical heating element) for preventing ice or snow from building-up and blocking the opening. The heater will most preferably be located adjacent the second end of the opening in the base. The base has an upwind side that faces toward the front of the vehicle and a lee side that faces toward the back of the vehicle. The second/exhaust end of the opening in the base is located at the lee end of the base such that, when the vehicle is moving, air currents produce a low pressure region behind the base that serves to draw undesirable gases/fumes from the compartment and reduce the pressure within the compartment for drawing fresh air into the compartment. Most preferably, the vent hole will be located at the high point of the compartment so that lighter fumes may escape the compartment by gravity alone when the vehicle is idle.

BRIEF DESCRIPTION OF THE DRAWINGS

The invention will be better understood when considered in the light of the following detailed description of certain specific embodiments thereof which is provided hereafter in conjunction with the several drawings in which:

FIG. 1 is a side elevational view of a vehicle that includes the present invention.

FIG. 2 is a partially broken away, side elevational view of one embodiment of a vehicle vent in accordance with the present invention.

FIG. 3 is a partially broken away, side elevational view of another embodiment of a vehicle vent in accordance with the present invention.

DESCRIPTION OF THE PREFERRED EMBODIMENT

FIG. 1 depicts a vehicle having a roof 4 defining a passenger compartment 6. A radio antenna 8 has a base 10 anchored to the roof 4. A second roof (i.e. decklid) 12 overlies a compartmetnsl4 which serves as a trunk or boot for storage. As best shown in FIGS. 2 and 3, the base 10 comprises a hollow molding 16 having a fitting (not shown) on an upper end thereof adapted to mate with a cooperating fitting 18 on the lower end of a radio antenna 20. A rubber gasket conforms to, and mates with, the bottom 24 of the base 10 and provides a seal between the base 10 and the vehicle's roof 4. The base 10 includes a hollow threaded stud 26 for anchoring the base 10 to the roof 4 through an aperture 28 therein. A nut 30 cooperates with the threaded stud 26 to secure the base 10 to the roof 4. An antenna wire 43 extends from the antenna 20 through the hollow stud 26 into the passenger compartment 6, and extends to the radio (not shown) beneath a gas permeable headliner.

In accordance with the present invention, a hole 36 is provided through the roof 4, and an opening 38 provided through the base 10. The opening 38 is aligned with the hole 36 to vent the compartment 6 to the atmosphere surrounding the vehicle 2. The opening 38 has one end 40 adjacent the hole 36 and another end 42 (i.e. exhaust end) that opens to the atmosphere. The exhaust end 42 includes a barrier 44 to the incursion of rain, sleet or snow into the opening 38, which barrier takes the form of at least one (preferably 2 or more) downwardly extending louvers 46. The exhaust end 42 of the opening 38 is preferably located at the back, or lee, side 48 of the base 10 where the air currents passing around the base 10 (i.e. when the vehicle is in motion) create a low pressure region which serves to draw undesirable fumes from the compartment 6 and reduce the pressure in the compartment so that fresh air can be drawn thereinto through wherever unsealed air gaps might exist. The embodiment shown in FIG. 3 is similar to that shown in FIG. 2 except that the rain/snow/sleet barrier comprises a downwardly opening nozzle 50. Most preferably, the hole 38 includes a heater (e.g. electrical resistance heating element 52) adjacent the exhaust opening 42,50 for preventing ice or snow from building up and blocking the opening 38. Suitable wiring and switch (not shown) connect the heating element 52 to a suitable on board power source (e.g. battery, generator, fuel cell, etc.)

While the invention has been disclosed in the content of certain specific embodiments thereof, it is not intended to be limited thereto, but rather only to the extent set forth hereafter in the claims which follow.

What is claimed is:

1. In a vehicle having a roof defining a compartment, and a radio antenna base secured to said roof, the improvement comprising a vent for said compartment comprising a hole through said roof and an opening through said base aligned with said hole to communicate and vent said compartment to the atmosphere outside said vehicle.

2. A vehicle according to claim 1 wherein said opening has a first end adjacent said hole and a second end opening to said atmosphere remote from said first end, said second end including a barrier to the intrusion of rain, sleet or snow into said opening.

3. A vehicle according to claim 2 wherein said barrier comprises at least one louver.

4. A vehicle according to claim 2 wherein said barrier comprises a nozzle.

5. A vehicle according to claim 2 comprising a heater in said opening adjacent said barrier for preventing ice or snow build-up in said opening.

6. A vehicle according to claim 2 wherein said base has an upwind side and lee side relative to the direction of movement of said vehicle, and said second end is located on said lee side.

7. A vehicle according to claim 1 comprising a heater in said opening for preventing ice or snow build-up in said opening.

8. A vehicle according to claim 1 wherein said compartment is a passenger compartment.

* * * * *